(12) United States Patent
Bachner, III et al.

(10) Patent No.: US 7,149,511 B1
(45) Date of Patent: Dec. 12, 2006

(54) WIRELESS INTELLIGENT PERSONAL SERVER

(75) Inventors: Edward F. Bachner, III, Lockport, IL (US); John Major, Rancho Santa Fe, CA (US); Xin Du, Bartlett, IL (US)

(73) Assignee: Rosetta-Wireless Corporation, Oakbrook Terrace, IL (US)

(*) Notice: Subject to any disclaimer, the term of this patent is extended or adjusted under 35 U.S.C. 154(b) by 488 days.

(21) Appl. No.: 09/652,734

(22) Filed: Aug. 31, 2000

(51) Int. Cl.
*H04Q 7/20* (2006.01)
*H04Q 7/32* (2006.01)

(52) U.S. Cl. .............. 455/419; 455/412.1; 455/412.2; 455/418; 455/422.1; 455/550.1; 455/557; 455/556.1; 709/202; 709/203; 709/216; 709/219

(58) Field of Classification Search .......... 455/550, 455/556, 557, 566, 572, 573, 418, 419, 420, 455/403, 422, 412, 414, 517, 554, 555, 558, 455/575, 90, 412.1, 412.2, 426.1, 426.2, 455/500, 502, 423, 424, 425, 67.11, 552.1, 455/562.1, 556.1, 561, 466, 414.4; 345/901, 345/903, 905, 1.1, 2.3, 3.1; 709/202, 203, 709/216, 219
See application file for complete search history.

(56) References Cited

U.S. PATENT DOCUMENTS

| | | | |
|---|---|---|---|
| 4,916,441 A * | 4/1990 | Gombrich | 455/575 |
| 5,297,192 A * | 3/1994 | Gerszberg | 455/419 |
| 5,438,611 A | 8/1995 | Campana, Jr. et al. | |
| 5,479,472 A | 12/1995 | Campana, Jr. et al. | |
| 5,625,670 A | 4/1997 | Campana, Jr. et al. | |
| 5,754,625 A * | 5/1998 | Shimura | 455/573 |
| 5,802,312 A | 9/1998 | Lazaridis et al. | |
| 5,819,172 A | 10/1998 | Campana, Jr. et al. | |
| 5,953,507 A | 9/1999 | Cheung et al. | |
| 5,982,520 A | 11/1999 | Weiser et al. | |
| 6,003,068 A * | 12/1999 | Sopko | 709/205 |
| 6,058,106 A | 5/2000 | Cudak et al. | |
| 6,067,451 A | 5/2000 | Campana, Jr. et al. | |
| 6,108,727 A * | 8/2000 | Boals et al. | 710/68 |
| 6,112,206 A * | 8/2000 | Morris et al. | 707/10 |
| 6,128,661 A | 10/2000 | Flanagin et al. | |

(Continued)

FOREIGN PATENT DOCUMENTS

EP    1 016 986 A2    7/2000

*Primary Examiner*—Keith Ferguson
(74) *Attorney, Agent, or Firm*—Momkus McCluskey; Jefferson Perkins

(57) ABSTRACT

A wireless intelligent personal server includes a radio frequency (RF) receiver, a memory for storing electronic files, a set of embedded machine language instructions, a central processing unit (CPU), a first interface for a display device, such as a personal digital assistant (PDA), and a second interface for a wireless telephone. The RF receiver receives downstream data transmitted over a downstream wireless communications channel. The CPU executes the machine language instructions to process the downstream data and, thereby, either update an existing target electronic file stored in the memory, so that the target electronic file reflects changes made to a source electronic file, or create a new electronic file in the memory. A display device may be brought into communication with the wireless intelligent personal server, via the first interface, to access the electronic files stored in the memory. The wireless intelligent personal server may also transmit an upstream signal over an upstream wireless communication channel, such as by using a wireless telephone, in communication via the second interface. The upstream signal may acknowledge receipt of the downstream data, or it may include upstream data reflecting changes to the electronic files stored in the memory made by the display device.

80 Claims, 3 Drawing Sheets

U.S. PATENT DOCUMENTS

| | | |
|---|---|---|
| 6,198,920 B1 | 3/2001 | Doviak et al. |
| 6,198,941 B1 | 3/2001 | Aho et al. |
| 6,272,545 B1 | 8/2001 | Flanagin et al. |
| 6,279,153 B1 | 8/2001 | Bi et al. |
| 6,311,058 B1 * | 10/2001 | Wecker et al. ............. 455/418 |
| 6,317,592 B1 | 11/2001 | Campana, Jr. et al. |
| 6,317,793 B1 | 11/2001 | Toyosawa |
| 6,389,457 B1 | 5/2002 | Lazaridis et al. |
| 6,401,113 B1 | 6/2002 | Lazaridis et al. |
| 6,418,324 B1 | 7/2002 | Doviak |
| 6,430,601 B1 | 8/2002 | Eldridge et al. |
| 6,434,403 B1 * | 8/2002 | Ausems et al. ............ 455/556 |
| 6,438,585 B1 | 8/2002 | Mousseau et al. |
| 6,446,118 B1 | 9/2002 | Gottlieb |
| 6,463,463 B1 | 10/2002 | Godfrey et al. |
| 6,463,464 B1 | 10/2002 | Lazaridis et al. |
| 6,512,919 B1 * | 1/2003 | Ogasawara ................. 455/422 |
| 6,516,202 B1 | 2/2003 | Hawkins et al. |
| 6,546,425 B1 | 4/2003 | Hanson et al. |
| 6,680,923 B1 | 1/2004 | Leon |
| 6,701,378 B1 | 3/2004 | Gilhuly et al. |
| 6,721,288 B1 | 4/2004 | King et al. |
| 2001/0029178 A1 * | 10/2001 | Criss et al. ................. 455/419 |
| 2004/0204041 A1 * | 10/2004 | Fillebrown et al. ...... 455/556.1 |

* cited by examiner ns. More particularly, this invention relates to a
WIRELESS INTELLIGENT PERSONAL SERVER

BACKGROUND OF THE INVENTION

A. Field of the Invention

This invention relates to the field of wireless telecommunications. More particularly, this invention relates to a wireless intelligent personal server that receives data transmitted over a wireless communications channel and automatically processes it so as to maintain a copy of at least one electronic file stored in a source computer.

B. Description of Related Art

A typical modern office uses a number of different databases of information that are frequently updated. Examples of such databases include schedules, contact lists, price lists, real estate lists, and incoming e-mails. Such databases are typically stored as electronic files on either an office-wide server or on individual personal computers located in the office space. Typically, individual workers in the office space are able to use personal computers, usually with network connections, to access the databases. More particularly, the personal computers typically run applications that retrieve the desired information from the databases and display it to the user. With this configuration, the most up-to-date versions of the databases are typically available to the individual workers, even though the electronic database files are frequently updated.

However, many workers often work outside of the office environment at least one day per week, and, typically, it is more difficult to gain access to the most up-to-date versions of important electronic files when outside of the office environment. A currently used solution is to use portable computers to "dial in" to the office network using the PSTN, Internet, or other wireline networks. However, mobile workers do not always have access to wireline connections at all desired times. Accordingly, wireless communications systems have been developed by which mobile workers can access their office databases even without a wireline connection. As an example, some wireless telephones are able to send and receive limited amounts of data using the wireless application protocol (WAP).

However, most of these wireless communications approaches, including the WAP approach, use a "pull" methodology, whereby the user first requests the information and then waits for a response. This "pull" methodology has the disadvantage of high latency and, typically, high cost. The high latency arises from the delay that typically occurs in each step of the process of retrieving the desired information. In particular, there is the time spent entering the keystrokes needed to make the request, the airtime spent transmitting the request, the delay in having the request reaching the office network through intermediate networks, the delay in having the office network search through its databases to formulate a response, and the delay in transmitting the response through the intermediate networks and then over the air interface. The high latency is not only troublesome to the user; it leads to high costs due to the airtime needed to process the request and the response.

The problem becomes more acute the more interactive the transaction becomes. A user using WAP to retrieve a new e-mail message with an attachment provides a simple illustration of the problem. First, the user requests the new e-mail message and receives it after waiting for the latency period described above, for which the user is typically charged airtime. Second, the user reads the new e-mail message and sees that it has an attachment. Then the user must make another request to receive the attachment. The user waits for another latency period to receive it, thereby typically incurring additional airtime charges. Moreover, the latency period may be quite long, because files attached to e-mails are often quite large. Accordingly, existing "pull" approaches, such as WAP have substantial disadvantages.

Another problem with many technologies for receiving data over wireless channels is that they are highly device-specific, i.e., they are based on providing wireless functionality to existing devices, such as specific models of personal digital assistants (PDAs). However, there are a number of problems with device-specific approaches. First, many people use different computing devices at different times, so that providing only one of the user's computing devices with wireless functionality is, at best, only a partial solution. Second, different computing devices differ in their abilities to handle different types of data. For example, desktop PCs typically have much more memory than PDAs, and desktop PCs often have access to high quality monitors, speakers, and peripherals to display information and provide functionality to the user in ways that are unavailable to typical PDAs. On the other hand, PDAs also have many advantages over a desktop PC, such as portability. In addition to the availability of different hardware, different computing devices may have different operating systems and applications available to them. Accordingly, approaches that provide wireless functionality only to specific devices have substantial disadvantages.

For example, Kaufman, U.S. Pat. No. 6,034,621, discloses systems and methods for communicating changes made to a data file on a personal computer (PC) to a personal digital assistant (PDA). In accordance with some of the disclosed embodiments, when the data file on the PC is changed, synchronization information is transmitted over a paging network to a pager that is connected to the PDA, such as by a serial or parallel connection. A synchronization routine in the PDA then interacts with the synchronization information output from the pager to update the data file in the PDA.

While potentially reducing the latency problem, at least for small amounts of data, the Kaufman approach suffers from a number of disadvantages. First, PDAs are not typically on all of the time. Thus, update information may be missed because of the PDA being off. Second, PDAs typically have a very limited memory, i.e., 8 megabytes or less. Because of this limited memory, mobile workers may not be able to access some of the very large electronic files that they can access at their offices.

SUMMARY OF THE INVENTION

In a first principal aspect, the present invention provides a wireless intelligent personal server that comprises a radio frequency (RF) receiver for receiving downstream data transmitted over a wireless communications channel, a memory, a central processing unit (CPU), a set of embedded machine language instructions that are executable by the CPU for processing the downstream data to provide at least one electronic file in the memory, and a first interface for allowing an external display device to access the at least one electronic file.

In a second principal aspect, the present invention provides a wireless data communication system that comprises a wireless intelligent personal server and a wireless telephone in communication with the wireless intelligent personal server. The wireless intelligent personal server includes a memory and a radio frequency (RF) receiver. The RF receiver receives downstream data transmitted over a first wireless communications channel, and the wireless intelligent personal server processes the downstream data to provide at least one electronic file in the memory. The wireless telephone transmits an acknowledgement over a second wireless communications channel when the wireless intelligent personal server receives the downstream data.

In a third principal aspect, the present invention provides a wireless data display system that comprises a wireless intelligent personal server and a display device in communication with the wireless intelligent personal server. The wireless intelligent personal server includes a memory and a radio frequency (RF) receiver. The RF receiver receives downstream data transmitted over a wireless communications channel, and the wireless intelligent personal server processes the downstream data to provide at least one electronic file. The display device has at least one application that accesses the at least one electronic file to display information to a user.

In a fourth principal aspect, the present invention provides a method for updating a target electronic file to reflect changes made to a source electronic file. In accordance with the method, the target electronic file is stored in a wireless intelligent personal server. The wireless intelligent personal server receives downstream data transmitted over a wireless communications channel. The downstream data reflects changes made to the source electronic file. The wireless intelligent personal server automatically updates the target electronic file with the downstream data to provide an updated electronic file. A display device is brought into communication with the wireless intelligent personal server, and the display device accesses the updated electronic file.

In a fifth principal aspect, the present invention provides a method for creating, without user intervention, an electronic file on a wireless intelligent personal server. In accordance with the method, the wireless intelligent personal server receives downstream data transmitted over a wireless communications channel. The wireless intelligent personal server automatically creates the electronic file from the downstream data. A display device is brought into communication with the wireless intelligent personal server, and the display device accesses the electronic file.

DETAILED DESCRIPTION OF THE INVENTION

Figure 1:
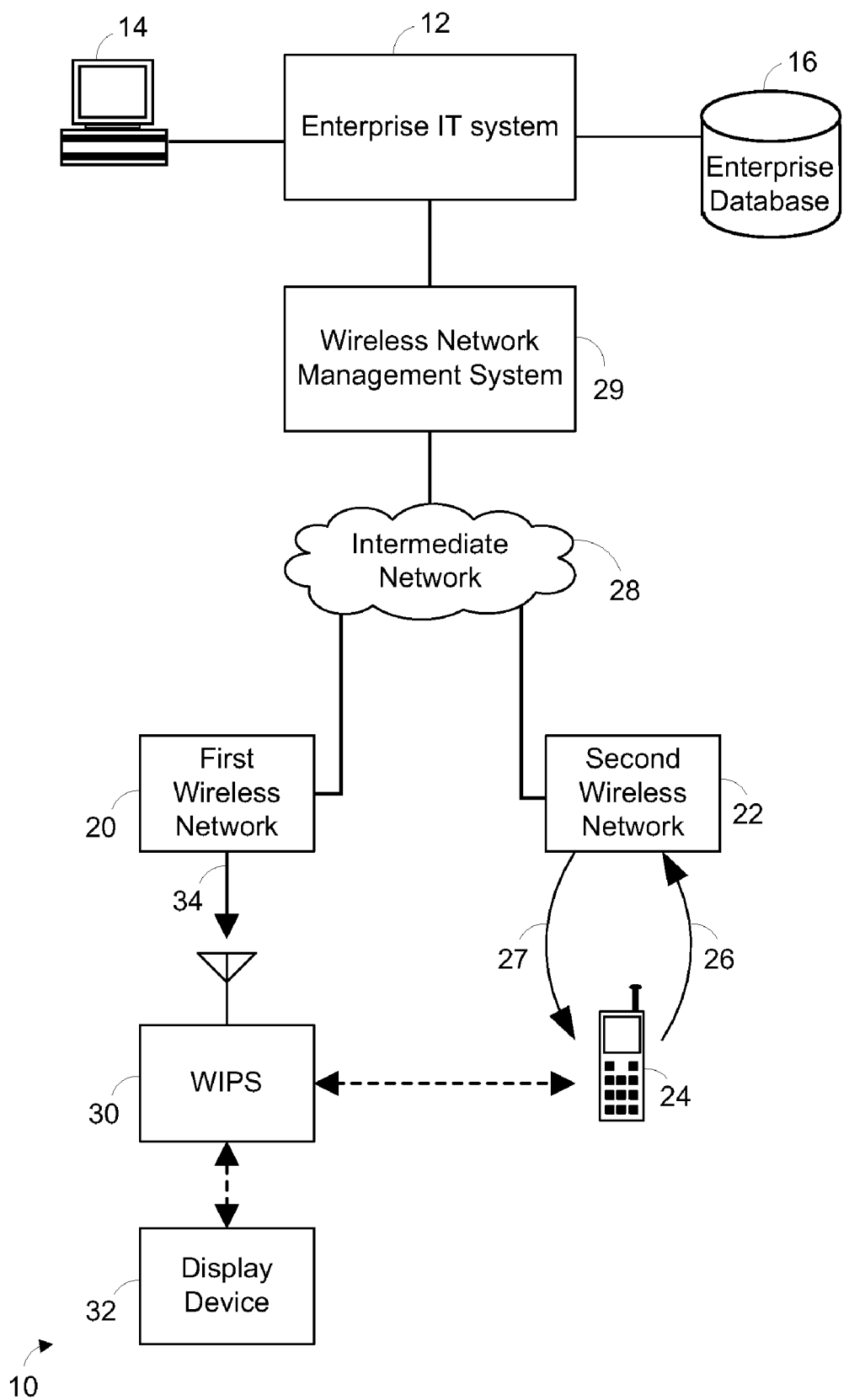
FIG. 1 is a functional block diagram of a wireless synchronization system, in accordance with an exemplary embodiment of the present invention.

FIG. 1 is a functional block diagram of a wireless communication system 10 in accordance with an exemplary embodiment of the present invention. System 10 includes an enterprise information technology (IT) system 12, which typically includes a plurality of computers and other devices networked together to provide computing and information technology services for a business or other organization. As shown in FIG. 1, one or more personal computers, such as personal computer (PC) 14, are connected to enterprise IT system 12. Enterprise IT system 12 may also have access to a centralized database for the enterprise, such as enterprise database 16, as shown in FIG. 1. Enterprise IT system 12 may be located entirely within one office area, or it may be distributed over various remote locations.

System 10 also includes a first wireless network 20 and a second wireless network 22. First wireless network 20 is able to transmit data, at least intermittently, over one or more downstream wireless channels to wireless receivers operating within its wireless coverage area. Preferably, first wireless network 20 uses subcarriers of frequency modulated (FM) radio transmissions and/or televisions transmissions to provide the downstream wireless channels. Most preferably, the subcarriers used by first wireless network 20 are modulated using orthogonal frequency division multiplexing (ODFM) in order to minimize multipath effects, such as fading and distortion, and to increase data throughput. Alternatively, first wireless network 20 may be a one-way paging network, which may use the FLEX™ protocol of Motorola, Inc., a two-way paging network, which may use the ReFLEX™ protocol of Motorola, Inc., or it may wirelessly transmit data by some other means.

Second wireless network 22 is preferably a cellular or PCS network that provides two-way wireless communications, in a format, such as AMPS, TDMA, CDMA, or GSM, for wireless telephones, such as wireless telephone 24. Thus, with reference to FIG. 1, wireless telephone 24 is able to transmit to wireless network 22 over an upstream channel 26 and is able to receive from wireless network 22 using a downstream channel 27.

An intermediate network 28 is connected to first wireless network 20 and to second wireless network 22, and enterprise IT system 12 uses a wireless network management system 29 to communicate with wireless networks 20 and 22, via intermediate network 28. Intermediate network 28 maybe any wide-area network (WAN) or local-area network (LAN) capable of transmitting digital data between enterprise IT system 12 and wireless networks 20 and 22. Preferably, intermediate network 28 is either the Internet or a private corporate network.

A wireless intelligent personal server (WIPS) 30 is able to receive data wirelessly transmitted by first wireless network 20. When WIPS 30 receives data transmitted by wireless network 20, WIPS 30 stores it in its memory, as described in more detail below. WIPS 30 is able to transfer the data stored in its memory to and from different types of display devices 32, on at least an intermittent basis, as indicated by the dotted line in FIG. 1. WIPS 30 may also be able to transfer data from its memory to and from wireless telephone 24 on at least an intermittent basis, as indicated by the dotted line in FIG. 1.

Display device 32 is a device that has a user interface for displaying the data stored in WIPS 30. More particularly, display device 32 typically runs one or more applications to access the data stored in WIPS 30 and to display it to the user. The applications on display device 32 may also allow the user to modify the data stored in WIPS 30. Display device 32 may be a fixed-mounted device, such as a desktop PC, an advanced video game device, such as a Sony "PlayStation 2" device, or a set-top television controller box, such as the type used to access services such as WebTV© (and which may also provide game-type functionality), or display device 32 may be a portable device, such as a laptop PC or a personal digital assistant (PDA). Moreover, WIPS 30 preferably allows different kinds of display device 32 to access the data stored on it at different times. For example, a user may use a first desktop PC as display device 32 to access the data stored in WIPS 30 at work, may use a PDA as display device 32 to access the data stored in WIPS 30 while traveling, and may use a Sony "PlayStation 2" device as display device 32 while at home.

Data transfer between WIPS 30 and wireless telephone 24 and display device 32 may occur in various ways. For example, WIPS 30 may be electrically connected to wireless telephone 24 and/or display device 32. Such electrical connection may be direct, i.e., so that electrical contacts on WIPS 30 directly contact electrical contacts on wireless telephone 24 and/or display device 32. Alternatively, the electrical connection may be through electrical cables, which may be provided with standard connectors, such as USB connectors. Data transfer between WIPS 30 and wireless telephone 24 and display device 32 may also be wireless. For example, WIPS 30 and either wireless telephone 24 or display device 32 may be provided with infrared ports, such as IrDA ports. Alternatively, WIPS 30 and either wireless telephone 24 or display device 32 may use short-range RF communication, such as the Bluetooth protocol, to transfer data. Other methods for data transfer may also be used. For example, WIPS 30 may be provided with a flash memory card, in which case data transfer to display device 32 may be effected by removing the flash memory card from WIPS 30 and connecting it to display device 32. In any event, the connections between WIPS 30 and wireless telephone 24 and display device 32 may be only intermittent. For example, in some embodiments, wireless telephone 24 may be directly electrically connected to WIPS 30 most of the time. However, the user may disconnect wireless telephone 24 from WIPS 30 in order to make or receive calls.

WIPS 30 receives data transmitted by first wireless network 20 over a downstream channel 34. Because this data transmission may occur at any time, WIPS 30 is preferably always on in order to receive the transmission. When WIPS 30 receives a data transmission, WIPS 30 determines whether the transmission is intended for it, and, if it is, WIPS 30 processes the data transmission accordingly. Typically, this means that WIPS 30 uses the data from the transmission either to update one or more of the files stored in its memory or to add a new file to its memory. Preferably, WIPS 30 performs these functions automatically, so that the user can receive the data while performing other tasks. As described in more detail below, the user is then able to use display device 32 to access the data stored in WIPS 30.

Once WIPS 30 has successfully received the data transmission, WIPS 30 preferably sends an acknowledgement signal. In preferred embodiments, WIPS 30 uses wireless telephone 24 to send the acknowledgement signal to second wireless network 22 over an upstream channel 26. To accomplish this, WIPS 30 may make use of electrical contacts, provided in most types of wireless telephone 24, that enable wireless telephone 24 to be remotely controlled. Thus, WIPS 30 sends signals to wireless telephone 24 to cause it to dial a predetermined telephone number and then, once the call is established, to transmit the acknowledgement signal. Because the acknowledgement signal will typically be a digital signal, WIPS 30 may use different techniques for transmitting it, depending on the type of wireless telephone 24. For example, if wireless telephone 24 can only transmit analog signals, then WIPS 30 preferably modulates the digital acknowledgement signal before transmitting it to wireless telephone 24. If wireless telephone 24 can transmit digital signals, such as signals in CDMA, TDMA, or GSM format, then WIPS 30 may transmit the acknowledgement signal to wireless telephone 24 in digital packet form.

However, at certain times when WIPS 30 is ready to send the acknowledgement signal, wireless telephone 24 may not available. For example, wireless telephone 24 may not be connected to, or in the range of wireless communication with, WIPS 30. Wireless telephone 24 may also be unavailable because it is turned off or because it is engaged in a telephone call. When wireless telephone 24 is unavailable, WIPS 30 preferably postpones the acknowledgement until wireless telephone 24 becomes available for use. First wireless network 20 will typically re-transmit the data intended for WIPS 30 until the acknowledgement from WIPS 30 is received.

As an alternative approach, WIPS 30 may be able to transmit wireless signals on its own, without the need for wireless telephone 24. For example, WIPS 30 may use cellular digital packet data (CDPD) technology to transmit signals to second wireless network 22 over upstream channel 26. As another approach, first wireless network 20 may be a two-way network, in which case, WIPS 30 may use the upstream channels of first wireless network 20.

As noted above, the data stored in WIPS 30 may be accessed by display device 32. Preferably, display device 32 accesses the memory in WIPS 30 as it would an external device, such as an external hard drive or a server on a local area network (LAN). In this way, display device 32 can take advantage of the much larger memory that may be available in WIPS 30.

In addition, a user may use different display devices to access the data stored in WIPS 30 at different times. For example, a user may use a desktop PC to access WIPS 30 while at home, a laptop PC to access WIPS 30 while at work, a customer's device to access WIPS 30 while visiting a customer, and a PDA to access WIPS 30 while traveling. In this way, WIPS 30 may serve as a convenient storage device so that a user's important files are available wherever the user goes and are automatically and continually updated with new information wherever the user travels within the range of wireless network 20.

In this way, the electronic files stored in WIPS 30 may be automatically updated to reflect changes in the corresponding electronic files of enterprise IT system 12. This capability can be very important to a user who maintains important data files on enterprise IT system 12 at work but who also needs to access the information while the user is traveling. Such important data files may include the user's calendar of appointments, inventory availability and current pricing, contacts, and incoming e-mail messages.

For example, if the user is out of the office, the user's secretary may use computer 14 to enter a new appointment into the user's calendar. The calendar is typically stored as an electronic file on computer 14, enterprise database 16, or elsewhere on enterprise IT system 12. By means of WIPS 30, the user is able to have access to the updated calendar in the following way. Enterprise IT 12 sends the information needed to update the calendar to wireless network management system 29, which, in turn, transmits it to first wireless network 20 via intermediate network 28. First wireless network 20 then transmits the update information to WIPS 30 over downstream channel 34. WIPS 30 receives the transmission and uses the information to update the calendar stored as an electronic file in its memory. To signal that it has successfully received the update information, WIPS 30 uses wireless telephone 24 to transmit an acknowledgement over upstream channel 26 to second wireless network 22. Second wireless network 22, in turn, transmits the acknowledgement to wireless network management system 29, via intermediate network 28. Preferably, wireless network management system 29 resends the update information, via intermediate network 28, to first wireless network 20 for re-transmission until management system 29 receives the acknowledgement, in order to ensure that WIPS 30 receives the update information. In this way, updates to important files on enterprise IT system 12 are automatically sent to WIPS 30, so that WIPS 30 will maintain up-to-date copies of these important files. The user then brings WIPS 30 into communication with display device 32 in order to access the electronic files stored in WIPS 30.

In many cases, it is desirable to have changes made to the electronic files stored in WIPS 30 reflected in the files stored in enterprise IT system 12. In particular, display device 32 may change the electronic files stored in WIPS 30 that it accesses. For example, the accessed electronic file may be the user's incoming e-mail messages, in which case the user may wish to delete the incoming e-mails after the user has read them. WIPS 30 may make the change, e.g., deleting one or more of the incoming e-mail messages, in the electronic file stored in its memory. WIPS 30 may also generate a stream of upstream data in order to have the change reflected in the corresponding electronic file in enterprise IT system 12. WIPS 30 causes wireless telephone 24 to transmit the upstream data over upstream channel 26 to second wireless network 22, which then passes the upstream data to wireless network management system 29, via intermediate network 28. Management system 29 recognizes that a change is being requested, and, if the requested change is validated, management system 29 passes the upstream data to enterprise IT network 12. Enterprise IT network 12, in turn, uses the upstream data to change its copy of the electronic file.

System 10 may also "push" other files to WIPS 30. For example, system 10 may "push" subscription data transmissions, such as stock closing prices. System 10 may push audio files, such as conference calls or books in an audio format. System 10 may also push the calendars of others in a user's organization to allow scheduling of meetings.

Figure 2:
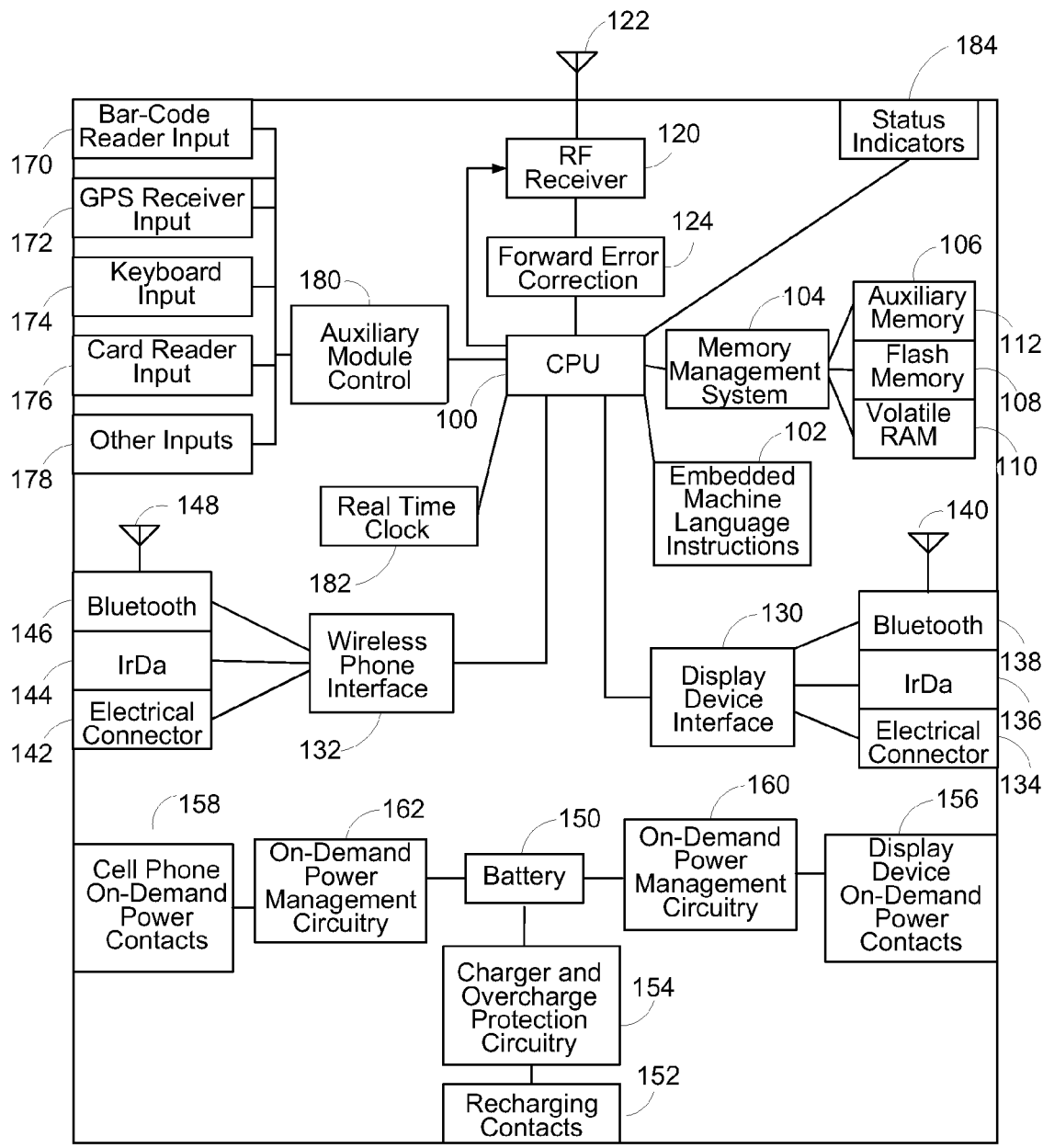
FIG. 2 is a functional block diagram of a wireless intelligent personal server, in accordance with an exemplary embodiment of the present invention.

Shown in FIG. 2 is a functional block diagram of WIPS 30, in accordance with an exemplary embodiment of the present invention. The operation of WIPS 30 is controlled by a central processing unit (CPU) 100 that executes a set of embedded machine language instructions 102. Embedded machine language instructions 102 are preferably contained a nonvolatile memory, such as a flash memory or a read only memory (ROM).

CPU 100 also has access, via a memory management system 104, to a memory system 106 for storing the electronic files that WIPS 30 automatically updates and that display devices are able to access. Memory system 106 preferably includes a non-volatile memory, such as a flash memory 108. The electronic files are stored primarily in flash memory 108. In preferred embodiments, flash memory 108 also contains embedded machine language instructions 102. Accordingly, flash memory 108 preferably has a capacity of 96 megabytes or larger, in order to be able to accommodate large electronic files. Flash memory 108 may also be removable and substitutable by the user.

Memory system 106 may also include other types of memory, such as a volatile random access memory (RAM) 110. Volatile RAM 110 may be DRAM, SRAM, or other type. Memory system 106 may also include an auxiliary memory 112, which may be a hard disk drive, such as the 340 megabyte Microdrive™ from IBM. Memory management system 104 manages memory system 106 by keeping track where memory is available in system 106 and routing data from CPU 100 to be stored in memory accordingly.

WIPS 30 includes a radio frequency (RF) receiver 120, which is provided with an antenna 122. Antenna 122 preferably includes crossed dipole segments, with each dipole tuned to resonate on opposite ends of the desired receiving band, so as to minimize multipath and cross-polarization fading.

RF receiver 120 receives signals from first wireless network 20 carried in wireless communication channel 34 and demodulates the signals in wireless communication channel 34 to extract the digital data. As shown in FIG. 2, RF receiver 120 is preferably controlled by CPU 100 to scan through the various wireless channels available to locate usable signals, i.e., signals using the correct modulation scheme and a low bit-error rate.

As noted above, wireless network 20 preferably uses OFDM subcarriers to FM and/or television broadcasts as its wireless communication channels. In the case that wireless network 20 is a two-paging network that uses the ReFLEX™ protocol, then the CreataLink™2 XT two-way data transceiver, available from Motorola, Inc., is an example of a system that my be used as RF receiver 120.

In order to make transmissions more reliable, the data carried in wireless communication channel 34 preferably includes forward error correction codes. Accordingly, the digital data from RF receiver 120 is preferably processed by forward error correction circuitry 124 in order to utilize the forward error codes, as needed, to provide corrected digital data. Forward error correction circuitry 124 may be provided by using the AHA4210 single-chip forward error correction device, which is available from Advanced Hardware Architectures, Pullman, Wash.

CPU 100 also typically controls a display device interface 130 and a wireless telephone interface 132. Display device interface 130 allows display device 32 to access electronic files stored in memory system 106. In some embodiments, interface 130 may provide display 32 only read-only access to memory system 106. Preferably, however, interface 130 also allows display device 32 to change the electronic files stored in memory system 106. In general, access by display device 32 will involve the transfer of digital data between WIPS 30 and display device 32. As noted above, this transfer of digital data may be over an electrical connection, or it may be over a wireless connection, such as IrDA or Bluetooth. Thus, display device interface 130 is preferably connected to at least one electrical connector 134 to electrically connect to display device 32. However, display device interface 130 may also be connected to an IrDa port 136 and/or to a Bluetooth transceiver 138 provided with an antenna 140.

Wireless telephone interface 132 allows WIPS 30 to control wireless telephone 24. As described above, WIPS 30 typically controls wireless telephone 24 to transmit signals to wireless network 22 over upstream wireless channel 26. The signals that WIPS 30 causes wireless telephone 24 to transmit may be simple acknowledgement signals or they may include digital data that reflects changes made to one or more electronic files stored in memory system 106. Accordingly, WIPS 30 may be provided with one or more means for transferring digital data to wireless telephone 24. Wireless telephone interface 132 is preferably connected to at least one electrical connector 142 to allow WIPS 30 to be electrically connected to wireless telephone 24. Interface 132 may also be connected to an IrDa port 144 and/or a Bluetooth transceiver 146 with an antenna 148 to allow communication with wireless telephone 24.

CPU 100, executing embedded machine language instructions 102, automatically controls the operation of WIPS 30 in the following way. When WIPS 30 receives a transmission, over wireless channel 34, containing downstream data, RF receiver 120 receives the transmission and demodulates it to retrieve the digital data. CPU 100 examines the digital data from RF receiver 120, optionally via forward error correction circuitry 124, to determine whether it is intended for WIPS 30. CPU 100, running instructions 102, may make this determination in various ways. Preferably, the digital data in the transmission will identify the intended recipient(s), such as by providing a destination code in a header of the transmission. CPU 100 then compares the destination code with a list of valid destination codes for WIPS 30, which list may be stored in memory system 106. The valid destination codes may be of various types, such as broadcast, multicast, or individual. A broadcast destination code would indicate that the transmission is intended for all devices in the coverage area of wireless network 20. A multicast destination code would indicate that the transmission is intended for a group of devices. An individual destination code would indicate that the transmission is intended for a specific WIPS. In any event, if the destination code in the transmission matches one of the valid destination codes for WIPS 30, then the transmission is intended for it.

If the digital data is intended for WIPS 30, then CPU 100, executing embedded machine language instructions 102, examines the digital data to determine how it should be processed. This determination may be made in various ways. Preferably, however, the header of the transmission will include a processing code to instruct WIPS 30 on how to process the downstream data. For example, some processing codes may indicate that the downstream data represents an entirely new file. In response, CPU 100, executing machine language instructions 102, would create a new electronic file, such as in flash memory 108, with the downstream data.

Other processing codes may indicate that the downstream data should be used to update a "target," i.e., already-existing, electronic file stored in WIPS 30. The target electronic file would also typically be identified in the header of the transmission. In response, CPU 100, executing machine language instructions 102, processes the downstream data to modify the target electronic file and thereby provide an update electronic file stored in memory system 106. To make the update process more efficient, the transmission may also contain an update script directing how CPU 100, running machine language instructions 102, should use the downstream data to update the target electronic file.

Still other processing codes may direct CPU 100 to perform other functions. For example, processing codes may specify that the downstream data should be used to update embedded machine language instructions 102.

Once CPU 100 receives a transmission intended for it, CPU 100 preferably controls WIPS 30 to send an acknowledgement signal. Thus, if wireless telephone 24 is in communication with WIPS 30, then CPU 100 preferably sends a signal to wireless telephone 24, via wireless telephone interface 132, to cause wireless telephone 24 to send an acknowledgement signal over upstream wireless channel 26. If wireless telephone 24 is not in communication with WIPS 30, then CPU 100 waits to send this signal until wireless telephone 24 is in communication with WIPS 30.

When display device 32 is in communication with WIPS 30, display device 32 typically runs one or more applications that need access to one or more of the electronic files stored in memory system 106. In such cases, display device 32 sends a signal to CPU 100, via display device interface 130, requesting access to the particular electronic file. If CPU 100 grants the access, then CPU 100 will typically copy portions of the requested file and transmit the copied portions to display device 32, via interface 130, as needed by the particular application. In this way, the electronic file is maintained in memory system 106 so that it will be available for later use.

Particular applications running on display device 32 may also attempt to change portions of the one or more accesses electronic files. In such cases, display device will typically transmit to CPU 100, via interface 130, a stream of digital data that embodies some or all of the requested changes. If CPU 100 allows the requested changes, then CPU 100 changes the electronic files stored in memory system 106 accordingly. If wireless telephone 24 is in communication with WIPS 30, then CPU 100 also causes wireless telephone 24, via wireless telephone interface 132, to transmit change data, i.e., digital data that embodies the changes to the electronic files, over upstream wireless channel 26. If wireless telephone 24 is not in communication with WIPS 30, then CPU 100 waits until wireless telephone 24 is in communication with WIPS 30.

In some cases, the downstream data received by WIPS 30 may be encrypted. For example, attachments to e-mail messages are commonly encrypted. A common approach for such encryption uses a public key infrastructure (PKI), such as "Pretty Good Privacy" (PGP) software. In the PGP approach, each user is assigned two codes: a public key and a private key. Each user uses his or her own private key to decrypt messages intended for that user, and uses an intended recipient's public key in order to encrypt messages intended for that recipient.

WIPS 30 preferably stores encrypted data in its encrypted form. Appropriate applications on display device 32 may then access the encrypted files stored in memory system 106 and decrypt them. For example, in the PGP approach, only users having the proper private key, which may be stored in display device 32, can decrypt the files stored in WIPS 30. Thus, having WIPS 30 store files in encrypted form provides better security by preventing users of display devices that do not have the proper private key from accessing the encrypted files.

On the other hand, the PGP approach of requiring that a sender maintain public keys for all intended recipients can consume substantial memory. In particular, each recipient's public key may be over a thousand characters long. Because many types of display devices, such as PDAs, have very limited memory, WIPS 30 may advantageously be used to store the public keys in its memory system 106.

WIPS 30 is powered by a battery 150 that is preferably rechargeable. Accordingly, WIPS 30 is provided with recharger contacts 152 to allow an external recharger to be connected. Charger circuitry 154 selectively couples recharging contacts 152 with battery 150 to control the process of recharging battery 150. Charger circuitry 154 preferably includes overcharge protection circuitry, such as is described in U.S. Pat. No. 5,867,008, which is incorporated herein by reference.

Preferably, battery 150 may also be used as a supplemental power source for display device 32 and wireless telephone 24. Accordingly, WIPS 30 is preferably provided with display device power contacts 156, for electrical connection to recharger contacts on display device 32, and with wireless telephone power contacts 158, for electrical connection to recharger contacts on wireless telephone 24. On-demand power management circuitry 160 selectively connects battery 150 to power contacts 156, and on-demand power management circuitry 162 selectively connects battery 150 to power contacts 158. On-demand power management circuitry 160 and 162 control the delivery of power to display device 32 and wireless telephone 24, respectively. Examples of such on-demand power management circuitry are described in co-pending U.S. application Ser. No. 09/123,775, filed on Jul. 28, 1998, which is incorporated herein by reference.

As shown in FIG. 2, WIPS 30 may also include various inputs 170–178 for connecting various functional modules and external devices. CPU 100 communicates with inputs 170–178, typically via one or more auxiliary module controls 180. Inputs 170–178 may be standard peripheral ports, such as serial, parallel, or USB, or slots for standard-sized cards or modules, such as PCMCIA, CompactFlash, or Handspring™ Springboard™, depending on the external device or module to be connected. For example, WIPS 30 may include a bar-code reader input 170 for connecting a bar-code reader. For example, a bar code wand card, with integrated bar code scanner, is available from Socket Communications, Inc. (Newark, Calif.) in a CompactFlash format. WIPS 30 may include a GPS receiver input 172 for connecting a global positioning system (GPS) receiver. For example, the Earthmate® GPS receiver, available from DeLorme (Yarmouth, Me.) can be connected to a serial port. WIPS 30 may include a keyboard input 174 for connecting an external keyboard. WIPS 30 may include a card reader input 176 for connecting a card reader. For example, the CardScan 500 business card scanner, available from Corex Technologies Corp. (Cambridge, Mass.), can be connected to computers via a USB or parallel port.

In general, WIPS 30 may also include other inputs 178 for connecting other devices. Such other devices may include biometrics devices. For example, the Ethenticator MS 3000 is a fingerprint verifier available from Ethentica (Lake Forest, Calif.) in a PCMCIA format. Such other devices may also include other wireless devices. For example, the CUE Radio, available from CUE Corporation (Irvine, Calif.), is a Handspring™ Springboard™ expansion module that is able to receive traffic, weather, and other data broadcast over FM subcarriers.

In addition, CPU 100 preferably has access to an internal real-time clock 182. CPU 100 may also control one or more status indicators 184. Status indicators 184 provide user-discernible indications of the status of WIPS 30. For example, one of status indicators 184 may indicate that WIPS 30 is on. Another one of status indicators 184 may indicate that WIPS 30 has received downstream data intended for it. Status indicators 184 may provide a visible and/or audible indication. Thus, for example, one of status indicators 184 may light up or beep when WIPS 30 receives a new e-mail message.

Figure 3:
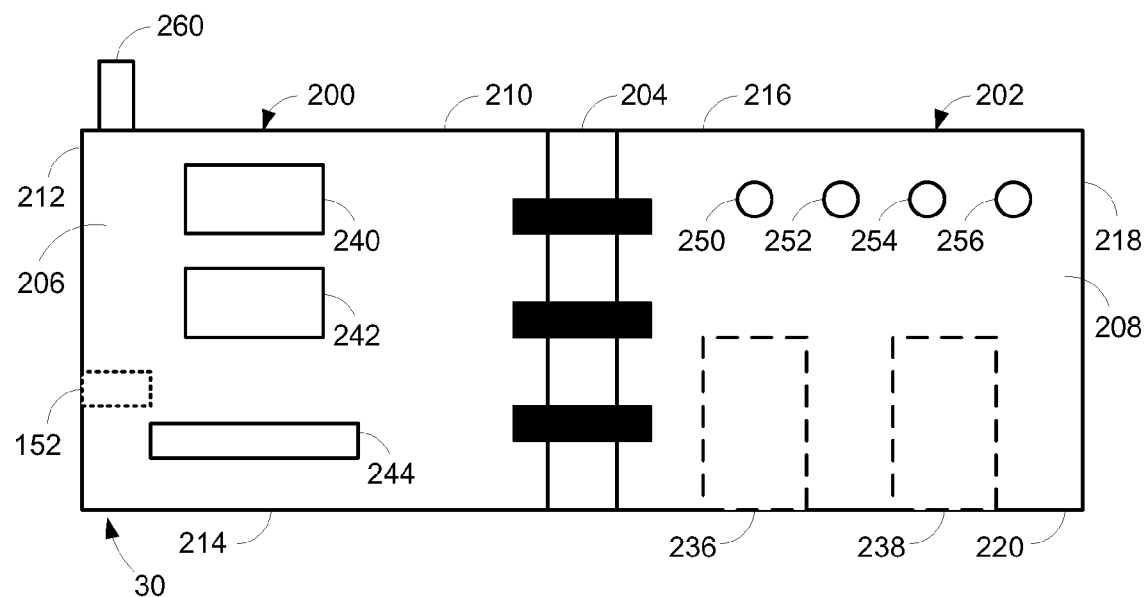
FIG. 3 is a front plan view of the wireless intelligent personal server of FIG. 2, in accordance with an exemplary embodiment of the present invention.
Figure 4:
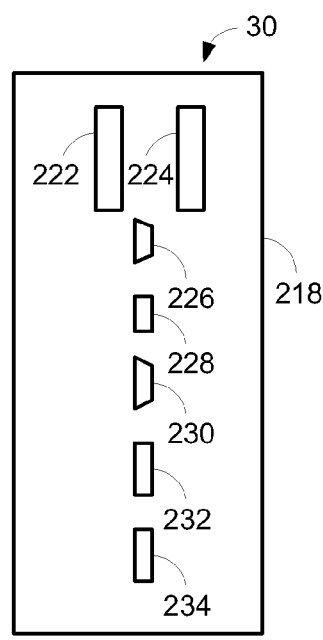
FIG. 4 is a side plan view of the wireless intelligent personal server of FIG. 2, in accordance with an exemplary embodiment of the present invention.

FIGS. 3 and 4 show a preferred mechanical configuration for WIPS 30. In general, WIPS 30 is preferably configured to attach to a paper-based folio, such as a Day-Timer™ folio. Thus, WIPS 30 preferably includes a left section 200, corresponding to the front cover of the paper folio, a right section 202, corresponding to the back cover of the paper folio, and a flexible section 204 joining sections 200 and 202. More particularly, left section 200 has a left folio-facing surface 206, against which the front cover of the paper folio may rest, and right section 202 has a right folio-facing surface 208, against which the back cover of the paper folio may rest. Left section 200 also has a top side 210, a left side 212, and a bottom side 214, as shown in FIG. 3. Similarly, right section 202 has a top side 216, a right side 218 and a bottom side 220.

Flexible section 204 allows surface 206 of section 200 and surface 208 of section 202 to move toward and away from each other, as the paper folio is closed and opened, respectively. WIPS 30 is preferably provided with loose-leaf binder rings that can be opened and closed to attach and disattach, respectively, the paper folio to WIPS 30. Alternatively, other means could be used to attach WIPS 30 to the paper folio.

The internal components of WIPS 30, such as CPU 100 and battery 150, may be mounted inside of either left section 200 or right section 202, or they may be distributed between sections 200 and 202. Various slots, connectors, and other external components may be mounted on one or more of surfaces 206 and 208 and sides 210–220. For example, as shown in FIG. 4, right side 218 may be provided with a PCMCIA slot 222, a flash memory slot 224, a serial port 226, a parallel port 228, a USB port 230, an IrDA port 232, and a specialized connector 234 for connecting a cable to wireless telephone 24. External components may also be provided in other locations in WIPS 30. For example, as shown in FIG. 3, bottom side 220 may also be provided with slots, such as PCMCIA slots 236 and 238. Recharging contacts 152 may be provided in left side 212. External components may also be mounted on surfaces 206 and 208. For example, surface 206 may be provided with connectors 240 and 242 for connecting modules, such as Springboard™ modules, and may also include a connector 244 for connecting an external keyboard. Status indicators 250–256, which may be light emitting diodes (LEDs), may also be mounted on surface 208, as shown in FIG. 3. Status indicators 250–256 may indicate various conditions relating to WIPS 30, such as whether it is on, whether it has received new data, or certain types of files, such as new e-mail messages, whether it has available memory remaining, whether the battery is low, or whether WIPS 30 has encountered a fault condition. WIPS 30 may also have a GPS antenna 260, which may be built into top side 210, as shown in FIG. 3, or built into a separate GPS module (not shown).

Although a representative configuration for mounting the external components for WIPS 30, such as slots and connectors, is shown in FIGS. 3 and 4, many other configurations may be used. In addition, although WIPS 30 may be connected to various external devices, such as an external keyboard, WIPS 30 preferably does not itself have a user interface or means for displaying the data that it stores. This is because display device 32 is intended to be used to perform these functions.

The approach of the present invention of providing a wireless intelligent personal server with a large memory and then using a display device to access files stored in the memory provides a number of advantages over existing wireless approaches. First, in contrast to prior art approaches of providing only specific devices with wireless functionality, preferred approaches of the present invention are substantially device independent, in that different display devices may be used to access the WIPS at different times.

Second, the preferred embodiments of the present invention provide a low apparent latency. In particular, although latency may be associated with transmitting downstream data to the WIPS, because the downstream data is "pushed" to the WIPS, i.e., transmitted without the user having to ask for it, and because the WIPS automatically receives the downstream data and updates its memory accordingly, the up-to-date information, such as the user's new e-mail messages and the current schedule, will be available on the WIPS on a nearly continual basis. Thus, in contrast to many prior art approaches, such as the WAP "pull" approach, a user need not incur airtime to retrieve the up-to-date information. Instead, the user may simply and easily access the up-to-date information by bringing the WIPS into communication with the display device.

Third, the preferred embodiments of the present invention substantially standardize the process of retrieving data over wireless communications channels. This is because the WIPS stores its data in a very generic format, namely electronic files, which display devices may then access in much the same way that they access files on hard drives or network servers. The preferred embodiments of the present invention do not need either proprietary file formats or proprietary synchronization routines to allow display devices to access the data stored in the WIPS. Accordingly, little or no modification may be required to use existing applications on many display devices.

Although various embodiments of this invention have been shown and described, it should be understood that various modifications and substitutions, as well as rearrangements and combinations of the preceding embodiments, can be made by those skilled in the art, without departing from the novel spirit and scope of this invention. Accordingly, the true spirit and scope of the invention is defined by the appended claims, to be interpreted in light of the foregoing specification.

The invention claimed is:

1. A wireless intelligent personal network server, comprising:
    a radio frequency (RF) receiver for receiving downstream data transmitted over a first wireless communications channel;
    a memory;
    a central processing unit (CPU);
    a set of embedded machine language instructions within said personal network server, said set of embedded machine language instructions being executable by said CPU for processing said downstream data to provide at least one electronic file in said memory; and
    a first interface for allowing an external display device to selectively access said at least one electronic file.

2. The wireless intelligent personal network server of claim 1, wherein said downstream data reflects changes made to at lease one source electronic file, said at least one electronic file being an updated version of at least one existing electronic file stored in said memory.

3. The wireless intelligent personal network server of claim 1, wherein said at least one electronic file is a new electronic file.

4. The wireless intelligent personal network server of claim 1, wherein said first interface allows said external display device read-only access to said at least one electronic file.

5. The wireless intelligent personal network server of claim 1, wherein said first interface allows said external display device to change said at least one electronic file.

6. The wireless intelligent personal network server of claim 1, wherein said external display device is a computer selected from the group consisting of desktop personal computer, laptop personal computer, and personal digital assistant (PDA).

7. The wireless intelligent personal network server of claim 6, wherein said external display device is a personal digital assistant (PDA).

8. The wireless intelligent personal network server of claim 1, wherein said first interface allows a first external display device to access said at least one electronic file at a first time and allows a second external display device to access said at least one electronic file at a second time.

9. The wireless intelligent personal network server of claim 8, wherein said first and second external display devices are different kinds of display device.

10. The wireless intelligent personal network server of claim 1, further comprising:
    a radio frequency (RF) transmitter for transmitting at least one signal over a second wireless communications channel.

11. The wireless intelligent personal network server of claim 10, wherein said RF transmitter transmits an acknowledgement signal over said second wireless communications channel when said RF receiver receives said downstream data.

12. The wireless intelligent personal network server of claim 11, wherein said RF transmitter transmits upstream data over said second wireless communications channel, said upstream data reflecting changes to said at least one electronic file made by said external display device.

13. The wireless intelligent personal network server of claim 1, further comprising:
    a second interface for controlling a wireless telephone to transmit at least one signal.

14. The wireless intelligent personal network server of claim 13, wherein said second interface controls said wireless telephone to transmit an acknowledgement signal when said RF receiver receives said downstream data.

15. The wireless intelligent personal network server of claim 13, wherein said second interface controls said wireless telephone to transmit upstream data, said upstream data reflecting changes to said at least one electronic file made by said external display device.

16. The wireless intelligent personal network server of claim 13, further comprising:
    a battery for powering said wireless intelligent personal network server.

17. The wireless intelligent personal network server of claim 16, further comprising:
    first power contacts for electrically connecting to recharger contacts disposed on said external display device; and
    a first power management circuit for selectively connecting said battery to said first power contacts.

18. The wireless intelligent personal network server of claim 16, further comprising:
    second power contacts for electrically connecting to recharger contacts disposed on said wireless telephone; and
    a second power management circuit for selectively connecting said battery to said second power contacts.

19. The wireless intelligent personal network server of claim 1, further comprising:
    a bar-code input for connecting a bar-code reader.

20. The wireless intelligent personal network server of claim 1, further comprising:
    a GPS input for connecting a global positioning system (GPS) receiver.

21. The wireless intelligent personal network server of claim 1, further comprising:
    a keyboard input for connecting an external keyboard.

22. The wireless intelligent personal network server of claim 1, further comprising:
    a card reader input for connecting a card reader.

23. A wireless data communication system, comprising:
a wireless intelligent personal network server, said wireless intelligent personal network server including a memory and a radio frequency (RF) receiver, said RF receiver being for receiving downstream data transmitted over a first wireless communications channel, said wireless intelligent personal network server processing said downstream data to provide at least one electronic file in said memory; and
a wireless telephone in communication with said wireless intelligent network server, wherein said wireless intelligent network server causes said wireless telephone to transmit an acknowledgment signal over a second wireless communications channel when said wireless intelligent network server receives said downstream data.

24. The wireless data communication system of claim 23, wherein said wireless intelligent personal network server includes an interface for allowing an external display device to access said at least one electronic file.

25. The wireless data communication system of claim 24, wherein said interface allows said external display device read-only access to said at least one electronic file.

26. The wireless data communication system of claim 24, wherein said interface allows said external display device to change said at least one electronic file.

27. The wireless data communication system of claim 24, wherein said external display device is a computer selected from the group consisting of desktop personal computer, laptop personal computer, personal digital assistant (PDA), and set-top television controller box.

28. The wireless data communication system of claim 27, wherein said external display device is a personal digital assistant (PDA).

29. The wireless data communication system of claim 24, wherein said interface allows a first external display device to access said at least one electronic file at a first time and allows a second external display device to access said at least one electronic file at a second time.

30. The wireless data communication system of claim 29, wherein said first and second external display devices are different kinds of display device.

31. The wireless data communication system of claim 24, wherein said wireless telephone transmits upstream data over said second wireless communications channel, said upstream data reflecting changes to said at least one electronic file made by said external display device.

32. The wireless data communication system of claim 23, wherein said wireless intelligent personal network server includes a battery for powering said wireless intelligent personal network server.

33. The wireless data communication system of claim 32, wherein said wireless intelligent personal network server includes:
first power contacts electrically connected to recharger contacts disposed on said wireless telephone; and
a first power management circuit for selectively connecting said battery to said first power contacts.

34. The wireless data communication system of claim 32, wherein said wireless intelligent personal network server includes:
second power contacts electrically connected to recharger contacts disposed on said external display device; and
a second power management circuit for selectively connecting said battery to said first power contacts.

35. A wireless data display system, comprising:
a wireless intelligent personal network server, said wireless intelligent personal network server including a memory and a radio frequency (RF) receiver, said RF receiver being for receiving downstream data transmitted over a first wireless communications channel, said wireless intelligent personal network server processing said downstream data to provide at least one electronic file; and
a separate display device in communication with said wireless intelligent personal network server, said separate display device having at least one application that selectively accesses said at least one electronic file to display information to a user.

36. The wireless data display system of claim 35, wherein said at least one application is able to change said at least one electronic file stored in said memory.

37. The wireless data display system of claim 35, wherein said separate display device is a computer selected from the group consisting of desktop personal computer, laptop personal computer, and personal digital assistant (PDA).

38. The wireless data display system of claim 37, wherein said separate display device is a personal digital assistant (PDA).

39. The wireless data display system of claim 35, wherein wireless intelligent personal network server includes a radio frequency (RF) transmitter for transmitting at least one signal over a second wireless communications channel.

40. The wireless data display system of claim 39, wherein said RF transmitter transmits an acknowledgement signal over said second wireless communications channel when said RF receiver receives said downstream data.

41. The wireless data display system of claim 39, wherein said RF transmitter transmits upstream data over said second wireless communications channel, said upstream data reflecting changes to said at least one electronic file made by said display device.

42. The wireless data display system of claim 35, wherein said wireless intelligent personal network server includes an interface for controlling a wireless telephone to transmit at least one signal.

43. The wireless data display system of claim 42, wherein said interface controls said wireless telephone to transmit an acknowledgement signal when said RF receiver receives said downstream data.

44. The wireless data display system of claim 42, wherein said interface controls said wireless telephone to transmit upstream data, said upstream data reflecting changes to said at least one electronic file made by said separate display device.

45. The wireless data display system of claim 35, wherein said wireless intelligent network server includes a battery for powering said wireless intelligent personal server.

46. The wireless data display system of claim 45, wherein said wireless intelligent personal network server includes:
first power contacts electrically connected to recharger contacts disposed on said separate display device; and
a first power management circuit for selectively connecting said battery to said first power contacts.

47. The wireless data display system of claim 45, wherein said wireless intelligent personal network server includes:
second power contacts electrically connected to recharger contacts disposed on said wireless telephone; and
a second power management circuit for selectively connecting said battery to said second power contacts.

48. A method for updating a target electronic file to reflect changes made to a source electronic file, said method comprising the steps of:
- storing said target electronic file in a wireless intelligent personal network server;
- said wireless intelligent personal network server receiving downstream data transmitted over a first wireless communications channel, said downstream data reflecting said changes made to said source electronic file;
- said wireless intelligent personal network server automatically updating said target electronic file with said downstream data to provide an updated electronic file;
- bringing an external display device into communication with said wireless intelligent personal network server; and
- selectively accessing said updated electronic file with said display device.

49. The method of claim 46, further comprising the step of:
- said wireless intelligent personal network server transmitting at least one signal over a second wireless communications channel.

50. The method of claim 49, wherein said at least one signal includes an acknowledgement signal for acknowledging receipt of said downstream data.

51. The method of claim 48, further comprising the step of:
- said wireless intelligent personal network server causing a wireless telephone to transmit at least one signal over a second wireless communications channel.

52. The method of claim 51, wherein said at least one signal includes an acknowledgement signal for acknowledging receipt of said downstream data.

53. A method for creating, without user intervention, an electronic file on a wireless intelligent personal network server, said method comprising the steps of:
- said wireless intelligent personal network server receiving downstream data transmitted over a first wireless communications channel;
- said wireless intelligent personal network server automatically creating said electronic file from said downstream data;
- bringing an external display device into communication with said wireless intelligent personal network server; and
- selectively accessing said electronic file with said display device.

54. The method of claim 53, further comprising the step of:
- said wireless intelligent personal network server transmitting at least one signal over a second wireless communications channel.

55. The method of claim 54, wherein said at least one signal includes an acknowledgement signal for acknowledging receipt of said downstream data.

56. The method of claim 53, further comprising the step of:
- said wireless intelligent personal network server causing a wireless telephone to transmit at least one signal over a second wireless communications channel.

57. The method of claim 56, wherein said at least one signal includes an acknowledgement signal for acknowledging receipt of said downstream data.

58. A wireless intelligent personal network server, comprising:
- a radio frequency (RF) transceiver for receiving downstream data transmitted over a first wireless communications channel;
- a memory;
- a central processing unit (CPU);
- a set of embedded machine language instructions within said personal network server, said set of embedded machine language instructions being executable by said CPU for processing said downstream data to provide at least one electronic file in said memory; and
- a first interface for allowing an external display device to selectively access said at least one electronic file.

59. The wireless intelligent personal network server of claim 58, wherein said downstream data reflects changes made to at least one source electronic file, said at least one electronic file being an updated version of at least one existing electronic file stored in said memory.

60. The wireless intelligent personal network server of claim 58, wherein said at least one electronic file is a new electronic file.

61. The wireless intelligent personal network server of claim 58, wherein said first interface allows said external display device access to said at least one electronic file.

62. The wireless intelligent personal network server of claim 58, wherein said first interface allows said external display device to change said at least one electronic file.

63. The wireless intelligent personal network server of claim 58, wherein said external display device is a computer selected from the group consisting of desktop personal computer, laptop personal computer, and personal digital assistant (PDA).

64. The wireless intelligent personal network server of claim 63, wherein said external display device is a personal digital assistant (PDA).

65. The wireless intelligent personal network server of claim 58, wherein said RF transceiver transmits at least one signal over a second wireless communications channel.

66. The wireless intelligent personal network server of claim 65, wherein said RF transceiver transmits an acknowledgement signal over said second wireless communications channel when said RF transceiver receives said downstream data.

67. The wireless intelligent personal network server of claim 66, wherein said RF transceiver transmits upstream data over said second wireless communications channel, said upstream data reflecting changes to said at least one electronic file made by said external display device.

68. The wireless intelligent personal network server of claim 58, further comprising:
- a bar-code input for connecting a bar-code reader.

69. The wireless intelligent personal network server of claim 58, further comprising:
- a GPS input for connecting a global positioning system (GPS) receiver.

70. The wireless intelligent personal network server of claim 58, further comprising:
- a keyboard input for connecting an external keyboard.

71. The wireless intelligent personal network server of claim 58, further comprising:
- a card reader input for connecting a card reader.

72. The wireless intelligent personal network server of claim 58, further comprising a second interface for controlling a wireless telephone to transmit at least one signal.

73. A wireless data display system, comprising:
- a wireless intelligent personal network server, said wireless intelligent personal network server including a memory and a radio frequency (RF) transceiver, said RF transceiver being for receiving downstream data transmitted over a first wireless communications channel, said wireless intelligent personal network server processing said downstream data to provide at least one electronic file; and a separate display device in communication with said wireless intelligent personal network server, said separate display device having at least one application that selectively accesses said at least one electronic file to display information to a user.

74. The wireless data display system of claim 73, wherein said at least one application is able to change said at least one electronic file stored in said memory.

75. The wireless data display system of claim 73, wherein said separate display device is a computer selected from the group consisting of desktop personal computer, laptop personal computer, and personal digital assistant (PDA).

76. The wireless data display system of claim 73, wherein said separate display device is a personal digital assistant (PDA).

77. The wireless data display system of claim 73, wherein said RF transceiver transmits an acknowledgement signal over a second wireless communications channel when said RF transceiver receives said downstream data.

78. The wireless data display system of claim 77, wherein said RF transceiver transmits upstream data over said second wireless communications channel, said upstream data reflecting changes to said at least one electronic file made by said separate display device.

79. The wireless data display system of claim 73, wherein said wireless intelligent personal network server includes a battery for powering said separate display device.

80. The wireless data display system of claim 73, wherein said wireless intelligent network server includes an interface for controlling a wireless telephone to transmit at least one signal.

* * * * *

(12) EX PARTE REEXAMINATION CERTIFICATE (8793rd)
United States Patent
Bachner, III et al.

(10) Number: US 7,149,511 C1
(45) Certificate Issued: Jan. 10, 2012

(54) WIRELESS INTELLIGENT PERSONAL SERVER

(75) Inventors: Edward F. Bachner, III, Lockport, IL (US); John Major, Rancho Santa Fe, CA (US); Xin Du, Bartlett, IL (US)

(73) Assignee: Rosetta-Wireless Corporation, Elmhurst, IL (US)

Reexamination Request:
No. 90/011,569, Mar. 14, 2011

Reexamination Certificate for:
Patent No.: 7,149,511
Issued: Dec. 12, 2006
Appl. No.: 09/652,734
Filed: Aug. 31, 2000

(51) Int. Cl.
*H04Q 7/20* (2006.01)
*H04Q 7/32* (2006.01)

(52) U.S. Cl. .............. 455/419; 455/412.1; 455/412.2; 455/418; 455/422.1; 455/550.1; 455/556.1; 455/557; 709/202; 709/203; 709/216; 709/219

(58) Field of Classification Search ............ 455/419
See application file for complete search history.

(56) References Cited

To view the complete listing of prior art documents cited during the proceeding for Reexamination Control Number 90/011,569, please refer to the USPTO's public Patent Application Information Retrieval (PAIR) system under the Display References tab.

*Primary Examiner* — Charles Craver

(57) ABSTRACT

A wireless intelligent personal server includes a radio frequency (RF) receiver, a memory for storing electronic files, a set of embedded machine language instructions, a central processing unit (CPU), a first interface for a display device, such as a personal digital assistant (PDA), and a second interface for a wireless telephone. The RF receiver receives downstream data transmitted over a downstream wireless communications channel. The CPU executes the machine language instructions to process the downstream data and, thereby, either update an existing target electronic file stored in the memory, so that the target electronic file reflects changes made to a source electronic file, or create a new electronic file in the memory. A display device may be brought into communication with the wireless intelligent personal server, via the first interface, to access the electronic files stored in the memory. The wireless intelligent personal server may also transmit an upstream signal over an upstream wireless communication channel, such as by using a wireless telephone, in communication via the second interface. The upstream signal may acknowledge receipt of the downstream data, or it may include upstream data reflecting changes to the electronic files stored in the memory made by the display device.

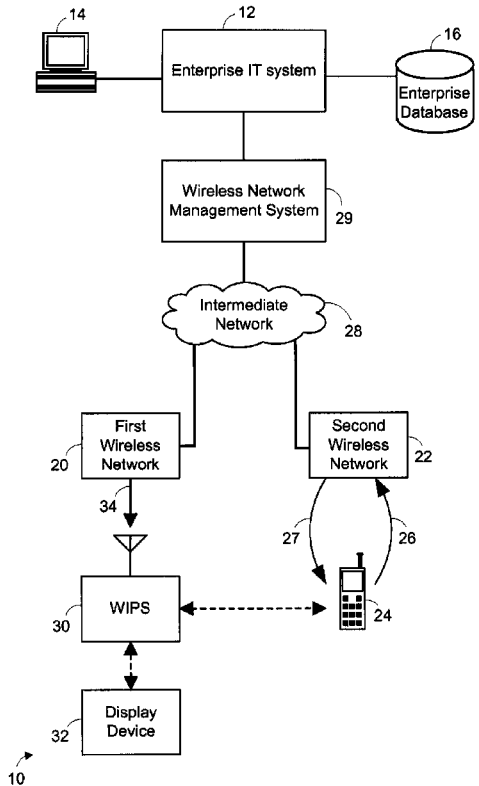

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 58 are determined to be patentable as amended.

Claims 2-57 and 59-80 were not reexamined.

1. A wireless intelligent personal network server, comprising:
   a radio frequency (RF) receiver for receiving downstream data transmitted over a first wireless communications channel;
   a memory;
   a central processing unit (CPU);
   a set of embedded machine language instructions within said personal network server, said set of embedded machine language instructions being executable by said CPU for procesing said downstream data to provide at least one electronic file in said memory; and
   a first interface for allowing *an application on* an external display device [to selectively access] *to pick and open* said at least one electronic file *while said at least one electronic file remains resident on said personal network server, wherein said personal network server is hand-portable*.

58. A wireless intelligent personal network server, comprising:
   a radio frequency (RF) transceiver for receiving downstream data transmitted over a first wireless communications channel;
   a memory;
   a central processing unit (CPU);
   a set of embedded machine language instructions within said personal network server, said set of embedded machine language instructions being executable by said CPU for processing said downstream data to provide at least one electronic file in said memory; and
   a first interface for allowing *an application on* an external display device [to selectively access] *to pick and open* said at least one electronic file *while said at least one electronic file remains resident on said personal network server, wherein said personal network server is hand-portable*.

\* \* \* \* \*